Dec. 2, 1924.

C. A. ROSSBACH

CORE PAD

Filed July 31, 1922

1,517,863

CLEMENT A. ROSSBACH
INVENTOR

BY Hadley F. Freeman
ATTORNEY

Patented Dec. 2, 1924.

1,517,863

UNITED STATES PATENT OFFICE.

CLEMENT A. ROSSBACH, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

CORE PAD.

Application filed July 31, 1922. Serial No. 578,796.

*To all whom it may concern:*

Be it known that I, CLEMENT A. ROSSBACH, a citizen of the United States, and a resident of Milwaukee, in the county of Milwaukee and State of Wisconsin, have invented certain new and useful Improvements in Core Pads, of which the following is a specification.

Flexible core-pads have heretofore been made of rubberized fabric and moulded into the desired shape. After such pads have been used a number of times they become hard and break when distorted in being removed from between the carcass and the core. I have constructed a flexible core-pad that will overcome the above difficulty.

In the drawings accompanying this specification and forming a part thereof I have shown, for purpose of illustration, one form which my invention may assume. In these drawings:—

Figure 1 is a partial side view of this illustrative embodiment, while

Figure 1:
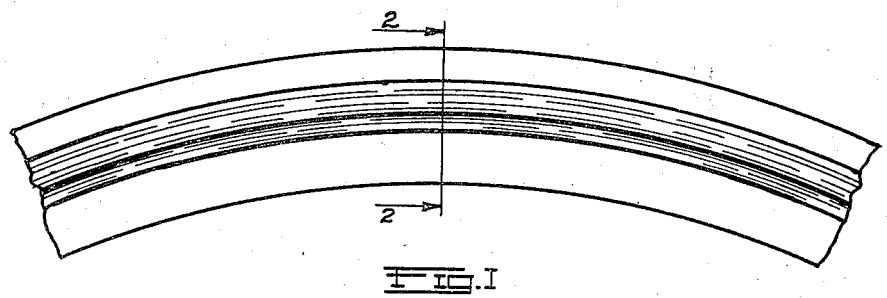
Figure 2:
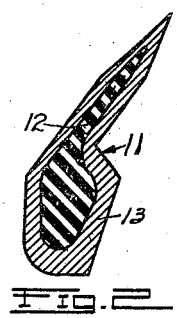
Figure 2 is a cross-sectional view taken on the line 2—2 of Figure 1.

In the drawings I have shown a core-pad 11 provided with a rubber core 12 which may be made up of sheeted rubber or tubed rubber, and an outer covering of fabric 13. A core-pad so constructed is more flexible and therefore enables the operator to more easily remove it from between the carcass and core without breaking.

I have disclosed a specific embodiment of my invention but this disclosure is illustrative only and my invention is not limited thereto.

I claim:

1. A core-pad having a flexible core and an outer covering of fabric.
2. A core-pad having a flexible rubber core and an outer covering of fabric.
3. A core-pad having a flexible core and an outer covering of rubberized fabric.

In testimony whereof I have signed my name to the above specification.

CLEMENT A. ROSSBACH.